United States Patent [19]
Peter

[11] 3,735,191
[45] May 22, 1973

[54] DYNAMIC CONVERGENCE CIRCUITS

[75] Inventor: Rene Peter, Basel, Switzerland
[73] Assignee: RCA Corporation, New York, N.Y.

[22] Filed: Apr. 15, 1971
[21] Appl. No.: 134,384

[30] Foreign Application Priority Data

Apr. 27, 1970 Great Britain....................20,090/70

[52] U.S. Cl.............315/13 C, 315/27 TD, 315/27 R
[51] Int. Cl...............................................H01j 29/50
[58] Field of Search......................315/13 C, 13 CG, 315/27 XY, 27 GD, 27 TD, 27 R

[56] References Cited

UNITED STATES PATENTS

| | | | |
|---|---|---|---|
| 2,903,622 | 8/1959 | Schopp | 315/13 C X |
| 2,910,618 | 10/1959 | Vasilevskis | 315/13 CG |
| 3,273,007 | 9/1966 | Schneider | 315/27 GD |
| 3,531,682 | 9/1970 | Jarosz | 315/13 C |
| 3,560,793 | 2/1971 | Payen | 315/13 C |
| 3,586,902 | 6/1971 | Siegel | 315/13 C X |

*Primary Examiner*—Carl D. Quarforth
*Assistant Examiner*—P. A. Nelson
*Attorney*—Eugene M. Whitacre

[57] ABSTRACT

A vertical rate dynamic convergence circuit for a multibeam color television kinescope incorporates a set of controls that permits adequate adjustment of the convergence currents to adapt the corrections afforded to the particular pattern of misconvergence errors encountered. The controls are associated with a pair of switching transistors which divide a parabolic voltage signal into substantially equal half portions. Such controls are effective to independently vary the amplitude of each half portion for combination in forming the convergence current. Master and differential controls are provided to cause beam convergence at most points of a scanned raster by confining the effects of each control to the red and green vertical convergence winding or to the blue vertical convergence winding, and to particular halves of the reproduced picture.

8 Claims, 3 Drawing Figures

Figure 1:
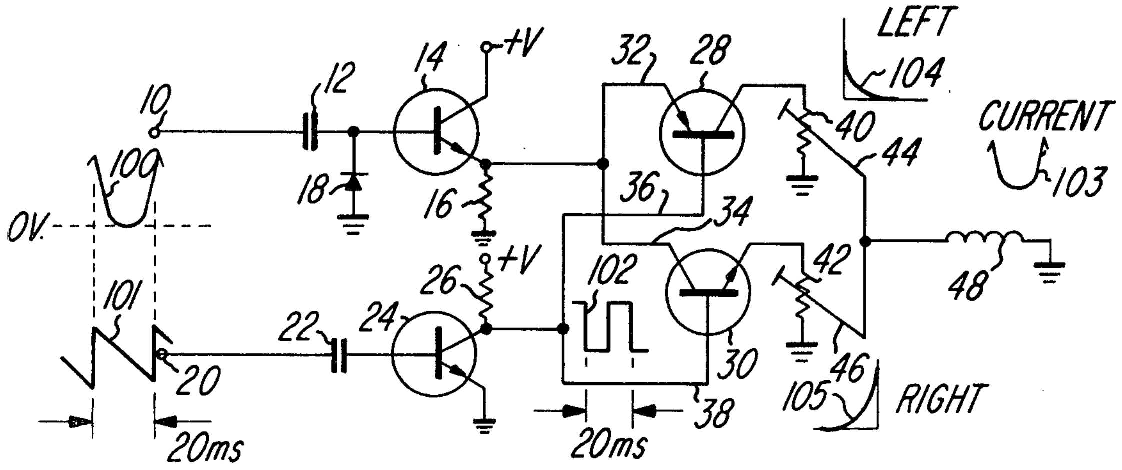

INVENTOR.
Rene Peter
BY
ATTORNEY

Patented May 22, 1973 3,735,191

2 Sheets-Sheet 2

DYNAMIC CONVERGENCE CIRCUITS

This invention relates to dynamic convergence circuits for a multibeam color television kinescope and, more particularly, to a novel and improved vertical rate convergence circuit.

As is well known, it is customary to provide dynamic convergence of beam misconvergence errors that inhere in the operation of color television receiver kinescopes—such as the conventional three-gun, shadow-mask picture tube. The nature of the correction requires energization of beam path altering structure with waveforms at both line and field rates. A widely accepted approach to the problem utilizes individual electromagnets associated with internal pole pieces which confine their effects to individual ones of the beams, and with separate windings on each electromagnet for respective vertical and horizontal frequency control.

In the conventional convergence structure associated with the delta beam arrangement of the three-gun kinescope, the beam shifts for red and green are diagonal (involving both vertical and horizontal components of motions), while the beam shift introduced by the blue convergence winding is vertical only. Because the diagonal axes of red and green beam motion are crossed, similar sense changes in red and green convergence currents introduce opposing horizontal shifts of the red and green beams and like vertical shifts. Conversely, mutually opposed changes in red and green convergence currents introduce opposing vertical shifts of the red and green beams, accompanied, however, by common direction horizontal shifts. By interrelating the red and green convergence winding energizations such that both master and differential control of their currents can be effected, the matching of red and green beam lading points can be separated into convenient horizontal line and vertical line alignment adjustments. Convergence adjustments can then be completed by appropriate adjustment of the blue convergence adjustment to complete the horizontal line alignment.

As is also well known, the misconvergence errors encountered at the top of the reproduced picture may not notch the misconvergence errors encountered at the bottom of the picture. Any practical convergence adjustment arrangement should take this into account by providing some facility for altering the end-of-scan waveform magnitude relative to the waveform magnitude at the beginning-of-scan. One difficulty common in prior art circuit arrangements was that controls that were provided to solve this problem by adjusting, for example, the end-of-scan magnitude relative to the beginning-of-scan magnitude (as set by another control) tended to disturb the beginning-of-scan magnitude at the same time, thus requiring readjustment of that other control.

As will become clear hereinafter, one aspect of the present invention is directed to convergence circuitry which is especially suited to development and control of the current in the vertical convergence winding of the above-mentioned electromagnets. A set of controls is provided to permit adequate adjustment of the convergence currents to adapt any needed correction to the particular pattern of misconvergence errors encountered. Each control is suited for its correction to a particular half of the picture, so that correction of a misconvergence pattern may be rapidly achieved without the complication of time-consuming interplay between controls.

In accordance with an embodiment of the present invention, a first voltage input provides a parabolic waveform which is obtained, for example, from the integration of a sawtooth voltage taken from a secondary winding of the vertical output transformer. A sawtooth waveform is provided as a second voltage input, illustratively from the cathode circuit of the vertical output tube. A pair of transistor switches of opposite conductivity type are configured to receive the parabolic signal, and are alternatively gated into operation by a pulse signal conversion of the sawtooth input. The pulse gating is such that one switch will provide the left half of the parabolic waveform as its output while the other switch will provide the right half of the parabola. Master and differential potentiometer controls are associated with each parabolic half at the switch outputs, whereby horizontal and vertical line alignment adjustments may be individually made for the red and green beams at the top and bottom of the raster. In addition, a master amplitude control is provided to enable separate and adjustable correction of the blue beam at the tope and bottom of the raster, independent of any red-green beam correction.

Figure 2:
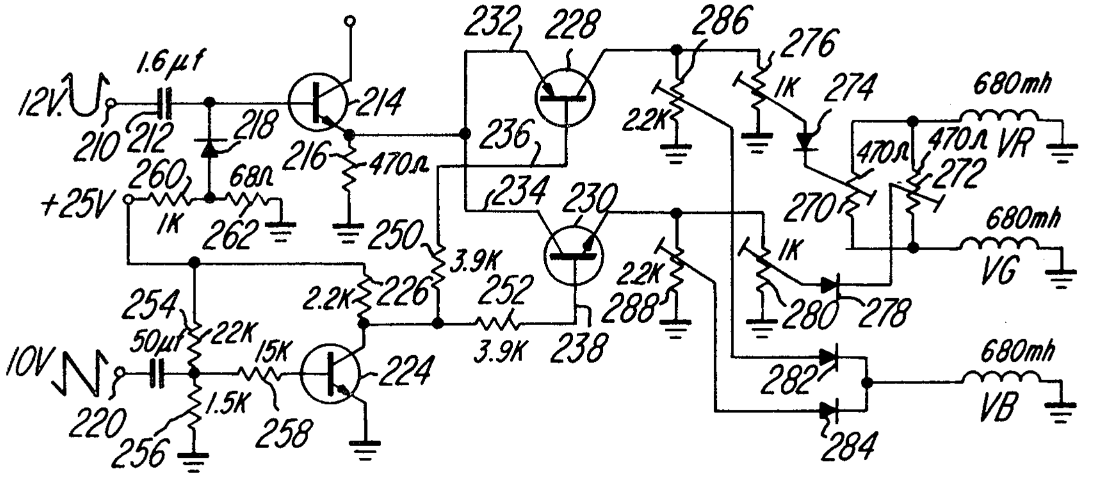
Figure 3:
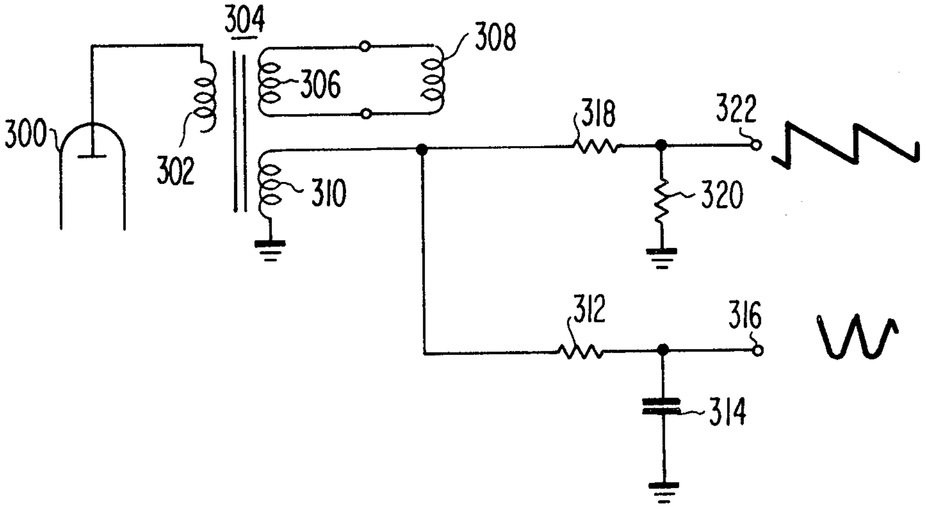

These and other features of the invention will be more fully understood from a consideration of the following description taken in connection with the accompanying drawings in which:

FIG. 1 schematically shows a transistor switching arrangement useful in an understanding of the operation of the invention;

FIG. 2 schematically illustrates a vertical rate convergence circuit for a color television receiver embodying the principles of the FIG. 1 construction; and FIG. 3 schematically shown a vertical deflection circuit for developing input voltage signals for the switching arrangement of FIG. 1.

Referring to FIG. 1, a parabolic voltage signal 100—-taken, for example, from a resistor-capacitor network which integrates an applied sawtooth—is applied by an input terminal 10 and a capacitor 12 to the base electrode of a transistor 14. With the emitter electrode of the transistor returned to ground via a resistor 16 and with the collector electrode returned to a source of unidirectional potential +V, the stage so formed comprises an emitter follower which guarantees a high input impedance for the parabolic waveform and a low output impedance for driving the subsequently coupled convergence exciter coils. A semiconductor rectifier 18 couples the base electrode of transistor 14 to a point of reference potential (such as ground) to clamp the parabolic waveform to that level, so as to protect against the flow of direct current through the exciter coil when the beam is in the middle of the screen and minimize the effects of the parabolic waveform on the static convergence provided. With an NPN transistor 14 shown, the anode of the rectifier 18 is at ground potential for the illustrated parabola input.

A sawtooth voltage signal 101 is also illustrated—obtainable, for example, from a point in the vertical output tube circuitry—and is applied via an input terminal 20 and a capacitor 22 to the base electrode of an additional transistor 24. With the emitter electrode of that transistor grounded and with the collector electrode returned to a source of unidirectional potential $+V_1$ by a resistor 26, the stage so formed comprises a pulse shaper when the amplitude of the sawtooth voltage 101 is sufficiently large to drive transistor 24 to saturation during its illustrated positive excursions. With the negative excursions being of amplitude sufficient to cut off transistor 24, the resulting pulse developed by such shaping action at the collector electrode of transistor 24 is illustrated by the signal waveform 102. As shown, transistor 24 is also of NPN conductivity type.

The parabolic voltage developed at the emitter electrode of transistor 14 and, also, the pulse voltage developed at the collector electrode of transistor 24 are applied to various electrodes of a pair of opposite conductivity transistors 28, 30, which together operate to divide the parabolic waveform into its respective left and right half portions. In particular, leads 32 and 34 couple the emitter electrode of transistor 14 to the emitter and collector electrodes of transistors 28, 30, respectively, while leads 36, 38 similarly couple the base electrodes of these latter two transistors to the collector electrode of transistor 24. Potentiometers 40 and 42 individually couple the collector electrode of transistor 28 and the emitter electrode of transistor 30 to ground, with the variable taps on their resistance elements being interconnected by leads 44, 46 for coupling to a convergence exciter coil 48 through which a parabolic current flows, as indicated by the waveform 103. With transistor 28 being of PNP conductivity type and with transistor 30 being of NPN type, the gating signal developed by the pulse shaping transistor 24 will render transistor 28 conductive during the first half of the parabolic voltage and will render that transistor non-conductive during the second half of the waveform. Conversely, the gating signal from transistor 24 will render transistor 30 non-conductive during the first half portion of the parabola, but will render it conductive during the second such portion. This indication of switching is shown by the waveforms 104, 105, which illustrate the division of the parabolic voltage into its respective half components at the output electrodes of transistors 28, 30 and across the potentiometers 40, 42. It will be readily apparent that independent adjustment of the setting of the variable tap of these potentiometers can couple different half portion amplitudes to the convergence coil 48. Because the parabolic waveform is only switched and not amplified by the transistors 28, 30, the temperature stability of the resultant arrangement can be made quite high.

Referring now to FIG. 2, a vertical rate convergence circuit which has been constructed is shown, with comparable components of the FIG. 1 schematic being indicated by the reference numeral employed therein increased in number by 200. In this respect, it will also be seen that the leads 236 and 238 which couple to the base electrodes of transistors 228, 230 are each returned to the collector electrode of transistor 224 by equal valued resistors 250, 252. A voltage divider for biasing the base electrode of transistor 224 is shown, as including resistors 254, 256 serially coupled between the $+V_1$ potential source and ground, with the junction of these two resistors being coupled to capacitor 222 and to the base electrode of transistor 224 by a further resistor 258. In addition, the rectifier 218 is referenced to a potential approximately equal to the sum of its forward voltage drop when conducting and the base-to-emitter offset voltage of transistor 214 by coupling to the junction of voltage divider resistors 260, 262 coupled between the $+V_1$ voltage source and ground.

The vertical convergence windings VR and VG of the respective red and green convergence magnets are illustrated as being directly tied to ground potential at one end and at the other end, to the opposite terminals of the resistance element of potentiometers 270, 272. The variable tap of potentiometer 270 is coupled to the cathode of a semiconductor rectifier 274, the anode of which is coupled to the variable tap of a potentiometer 276, whose resistance element is coupled between the collector electrode of transistor 228 and ground. In like manner, the variable tap of potentiometer 272 is coupled to the cathode of a second semiconductor rectifier 278, whose anode is coupled to the variable tap of a potentiometer 280, the resistance element of which is coupled between the emitter electrode of transistor 230 and that same reference potential point. One end of the vertical convergence winding VB of the blue convergence magnet is directly connected to ground, while its opposite end is coupled first, to the cathode of a further semiconductor rectifier 282 and second, to the cathode of an additional rectifier 284. As shown, the anodes of each of these rectifiers 282, 284 are coupled to variable taps on potentiometers, the anode of rectifier 282 being coupled to the tap on a potentiometer 286 having a resistance element coupled between the collector electrode of transistor 228 and ground, and the anode of rectifier 284 being coupled to the tap on a potentiometer 288 having a resistance element coupled between the emitter electrode of transistor 230 and ground. Also shown are illustrative component values employed in one satisfactorily operating circuit for the input signal waveforms indicated.

In FIG. 2, the switching operation of transistor 228 as controlled by transistor 224 provides the left half parabola at the top of potentiometer 276. Adjustment of its variable tap will be seen to provide a master amplitude control for the red and green winding currents in the beginning-of-scan period, and thus is suitable for vertical line alignment at the top of the raster. Adjustment of the variable tap of potentiometer 270 changes the resistance in the series paths including the coils VR and VG during the first half of scan and a differential adjustment in the currents through these windings. Potentiometer 270 thus provides a differential amplitude control for the red and green winding currents in the beginning-of-scan interval, and provides horizontal line alignment at the raster top. Conversely, the gating of transistor 230 by transistor 224 develops the right half portion of the parabolic voltage at the top of potentiometer 280 so that—as with potentiometer 276—adjustment of the variable tap of potentiometer 280 serves as a master amplitude control for the red and green winding currents in the end-of-scan interval, to thus be suitable for vertical line alignment at the bottom of the raster. Adjustment of the variable tap of potentiometer 272—coupled to potentiometer 280 in corresponding manner to the coupling of the variable tap of potentiometer 270 to potentiometer 276—serves as the differential amplitude control for the red and green winding currents in the end-of-scan interval, to control the horizontal line alignment at the raster bottom.

The control of blue convergence current at the raster top is similarly adjusted by variation of the tap on the potentiometer 286 for the first half of scan, while adjustment of the variable tap on potentiometer 288 controls the blue convergence current during the second half of scan, at the raster bottom. Rectifiers 274, 278,

282 and 284 are included in the FIG. 2 arrangement to permit relatively isolated top and bottom corrections to be made with the red and green winding potentiometers 270, 272, 276, 278 and with the blue winding potentiometers 286, 288. Rectifier 278, for example, prevents the setting of potentiometer 280 from affecting red and green winding current division established by potentiometer 272, while the other rectifiers 274, 282, 284 operate in effectively analagous manners.

FIG. 3 shows a vertical deflection circuit which may be used to develop the parabolic and sawtooth voltage signals for input terminals 10 and 20 of FIG. 1, respectively. The vertical output tube is schematically indicated by the reference numeral 300, the anode electrode of which is coupled to the primary winding 302 of an output transformer 304. One secondary winding of the transformer 306 is employed to develop the deflection signals for the vertical deflection coil 308 of the color kinescope (not shown), while another secondary winding 310 is utilized in providing the necessary parabolic and sawtooth voltages. MOre specifically, a resistor 312 and capacitor 314 are coupled to integrate the sawtooth waveform developed at the high potential end of winding 310 and to apply the resulting parabolic signal at output terminal 316. Second and third resistors 318, 320 also couple to that high potential terminal to serve as a voltage divider in providing a sawtooth signal of appropriate magnitude at output terminal 322. Besides offering the above advantage of enabling convergence currents to be adjusted with a high degree of independence, it will also be noted that the circuit described proves attractive in that its relatively high input impedance permits its adaptation with many different types of beam deflection systems. Low-power, low cost transistors and potentiometers can be used, and in a design which is both simple to construct and stable in the presence of temperature variations, the latter feature being provided, in part, by the operation of transistors in a switching, rather than in an amplifying, mode.

What is claimed is:

1. A vertical rate convergence circuit comprising:
a source of vertical rate voltage waves;
a convergence magnet winding;
a switching network including first and second transistors, each having their input and output electrodes serially coupling said source to said winding; and
means applying a gating voltage signal to the control electrodes of said first and second transistors to alternatively render respective ones of said transistors conductive, whereby said first transistor connects said source to energize said winding during a predetermined portion of the cycle of said vertical rate waves and whereby said second transistor connects said source to energize said winding only during the remaining portion of the cycle of said vertical rate waves.

2. The vertical rate convergence circuit of claim 1 wherein said switching network includes a pair of potentiometers, each having a resistance element between end terminals thereof for individually shunting the output electrodes of said first and second transistors to a point of reference potential, and also having an adjustable tap for coupling to a common end of said convergence magnet winding, whereby tap adjustment is effective to vary the magnitude of the energization of said winding during the conductive portion of the transistor associated with the potentiometer being adjusted.

3. The vertical rate convergence circuit of claim 1 wherein said last-mentioned means applies a gating signal to said first and second transistors to render said transistors alternatively conductive during respective half portions of the cycle of said vertical rate waves.

4. The vertical rate convergence circuit of claim 3 wherein said first transistor is of PNP type conductivity having emitter and collector input and output electrodes, respectively, wherein said second transistor is of NPN type conductivity having collector and emitter input and output electrodes, and wherein said first and second transistors each have a base control electrode.

5. The vertical rate convergence circuit of claim 4 where said last-mentioned means applies a gating signal to the base control electrodes of said transistors to render said first transistor conductive to energize said convergence winding during the first half of the cycle of said vertical rate waves and to render said second transistor conductive to energize said winding only during the second half of the cycle of said vertical waves.

6. In a color television receiver including a vertical deflection circuit providing a source of vertical rate voltage waveforms, a convergence circuit comprising:
a pair of convergence windings effectively coupled in parallel connection;
a switch network including first and second transistors, each having their input and output electrodes serially coupling said source to one end of each of said pair of windings;
means applying a gating voltage signal to the control electrodes of said first and second transistors to alternatively render respective ones of said transistors conductive, whereby said first transistor connects said source to energize said windings during a predetermined portion of the cycle of said vertical rate waves and whereby said second transistor connects said source to energize said windings only during the remaining portion of the cycle of said vertical rate waves; and
means associated with each transistor for varying the energization provided thereby to said windings in response to said gating signal, with said variation being in the same sense in each winding.

7. The convergence circuit of claim 6 also including:
means associated with each transistor for varying the energization provided thereby to said windings in response to said gating signal in mutually opposing sense in each winding, with this means substantially coupling like ends of said windings to receive the energization from said source.

8. The convergence circuit of claim 7 wherein said first-mentioned energization varying means comprises a first pair of potentiometers, each having a resistance element between end terminals thereof for individually shunting the output electrodes of said first and second transistors to a point of reference potential, and also having an adjustable tap for coupling to said convergence magnet windings, whereby tap adjustment is effective to vary the magnitude of the energization of said windings during the conductive portion of the transistor associated with the potentiometer being adjusted, and wherein said last-mentioned energization varying means comprises a second pair of potentiometers, each also having a resistance element between end terminals thereof for individually coupling said like ends of said convergence magnet windings, and also having an adjustable tap for coupling to said individual taps of said first pair of potentiometers, whereby adjustment of said second adjustable taps is effective to vary the division of the magnitude of energization between said convergence windings as provided during the conductive portion of the transistor associated with the one of the first pair of potentiometers to whose tap said second adjusted potentiometer tap is coupled.

* * * * *